United States Patent [19]

Rice

[11] 4,272,953
[45] Jun. 16, 1981

[54] REHEAT GAS TURBINE COMBINED WITH STEAM TURBINE

[76] Inventor: Ivan G. Rice, P.O. Box 233, Spring, Tex. 77373

[21] Appl. No.: 954,838

[22] Filed: Oct. 26, 1978

[51] Int. Cl.³ .............................................. F02C 6/18
[52] U.S. Cl. .............................. 60/39.04; 60/39.18 B
[58] Field of Search ........ 60/39.04, 39.18 R, 39.18 B, 60/39.16 R, 39.17, 39.55; 122/4 B

[56] References Cited

U.S. PATENT DOCUMENTS

| | | | |
|---|---|---|---|
| 2,605,610 | 8/1952 | Hermitte et al. | 60/39.18 B |
| 3,032,985 | 5/1962 | Alexander et al. | 60/39.16 |
| 3,232,052 | 2/1966 | Ricard | 60/39.18 B |
| 3,826,080 | 7/1974 | De Corso et al. | 60/39.55 |
| 3,832,845 | 9/1974 | Aguet | 60/39.18 B |
| 3,969,891 | 7/1976 | Aguet | 60/39.18 B |

FOREIGN PATENT DOCUMENTS 1003925   3/1952   France ................................ 60/39.18 B

OTHER PUBLICATIONS

Wade et al., *Low Emission Combustion for Regenerative Gas Turbine*, ASME Transactions, Jan. 1974.

*Primary Examiner*—Louis J. Casaregola
*Attorney, Agent, or Firm*—Harvey B. Jacobson

[57] ABSTRACT

A process and apparatus for generating useful power comprises the use of a combined reheat gas turbine and steam turbine cycle. The combined cycle optionally includes the superheating of steam and the reheating of steam in the reheat combustor of the reheat gas turbine. The use of second generation high-ratio, high-firing temperature gas generators in the combined cycle of the present invention yields increased efficiency and output heretofore unexpected from reheat gas and combined cycles.

16 Claims, 19 Drawing Figures

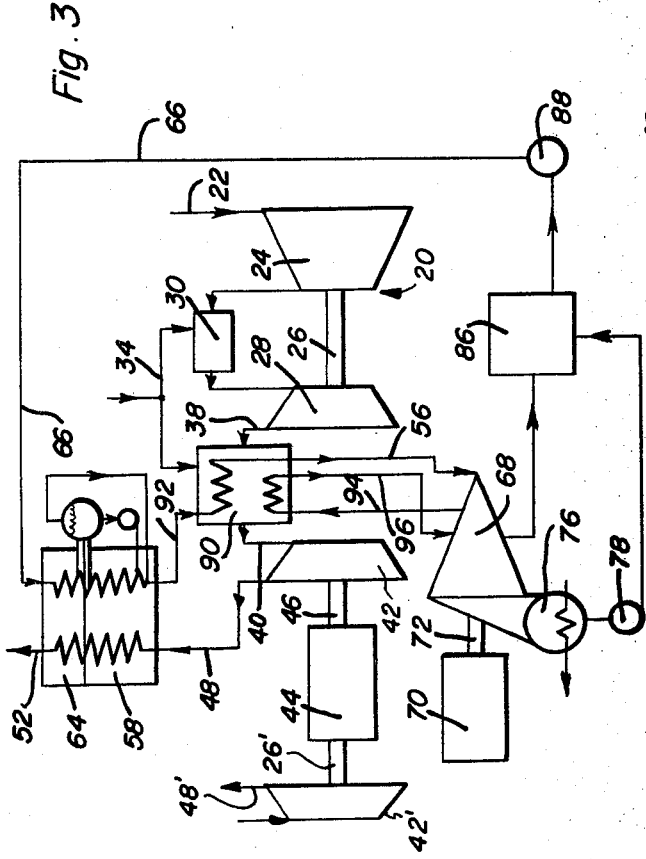
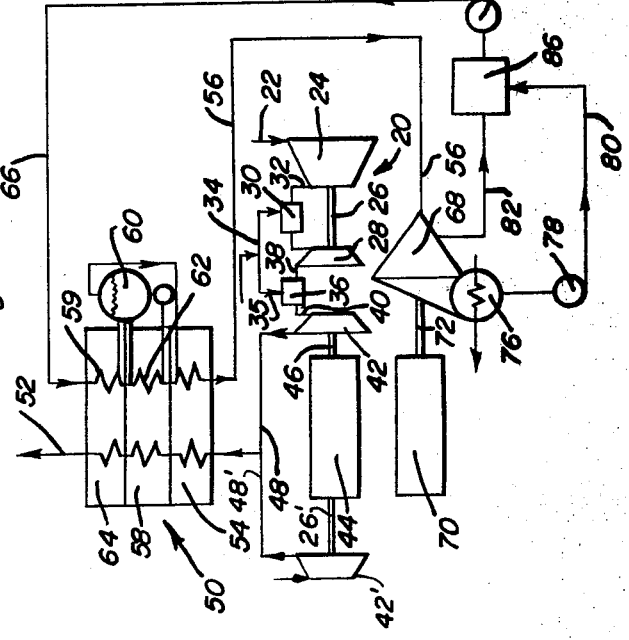
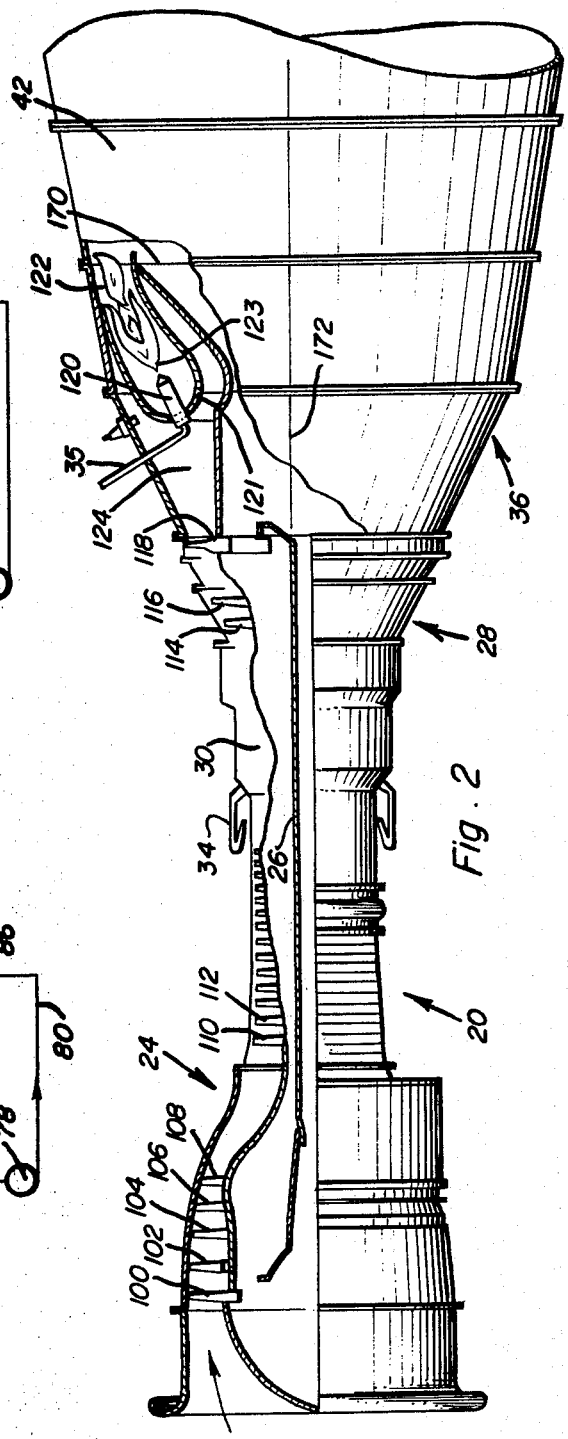

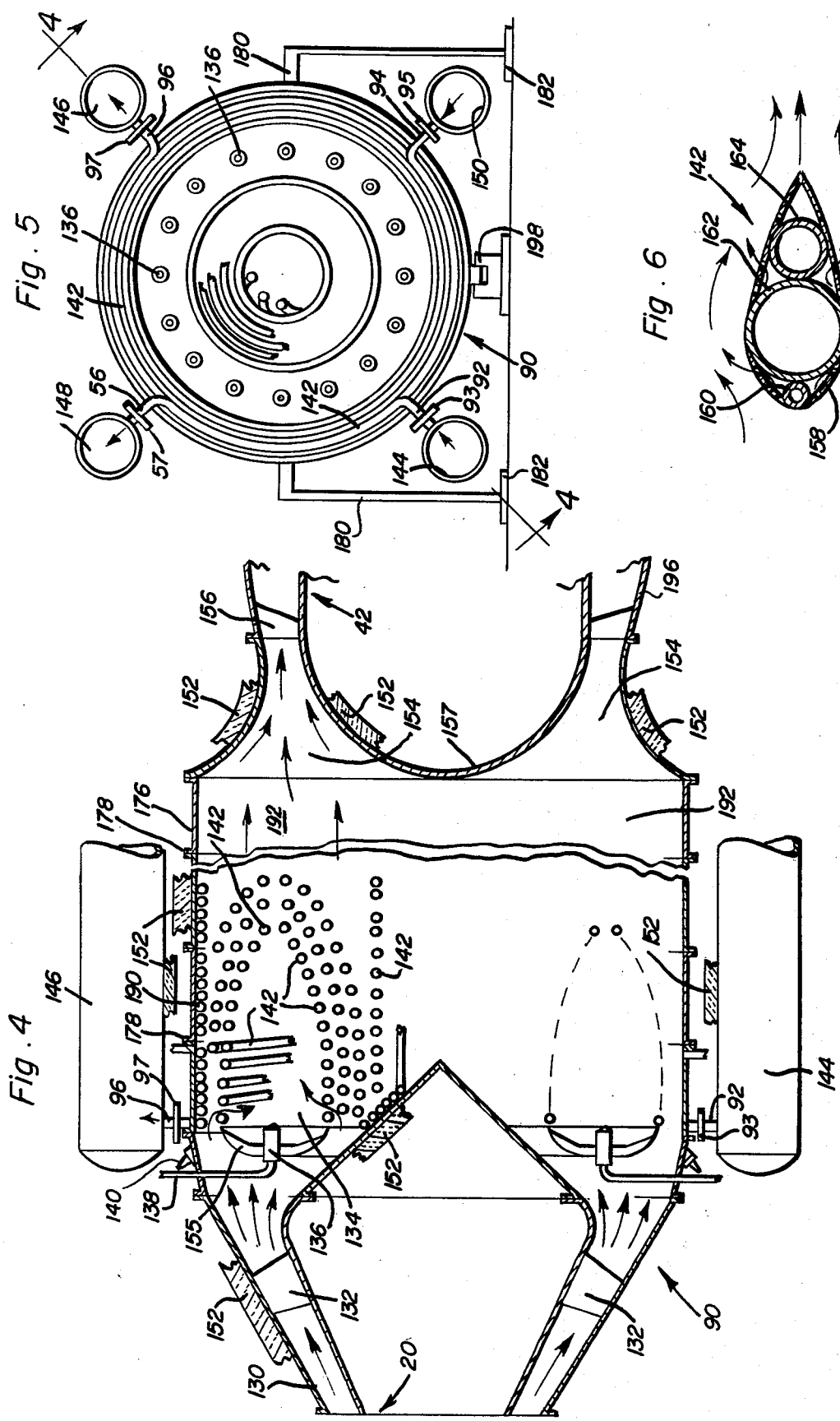

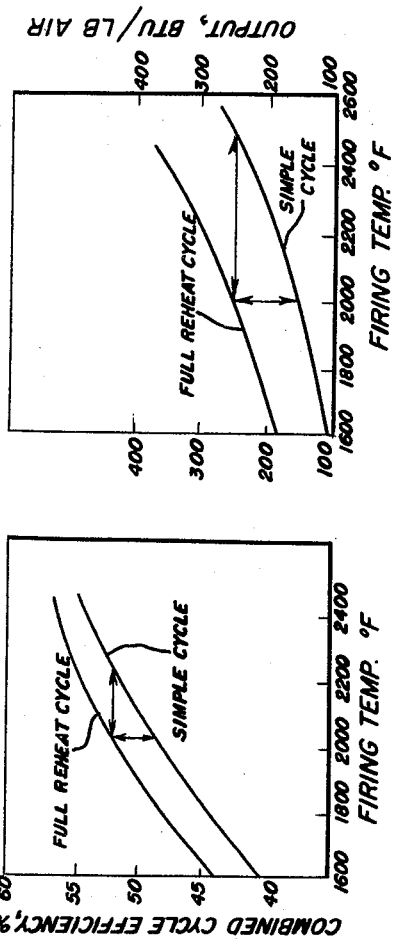
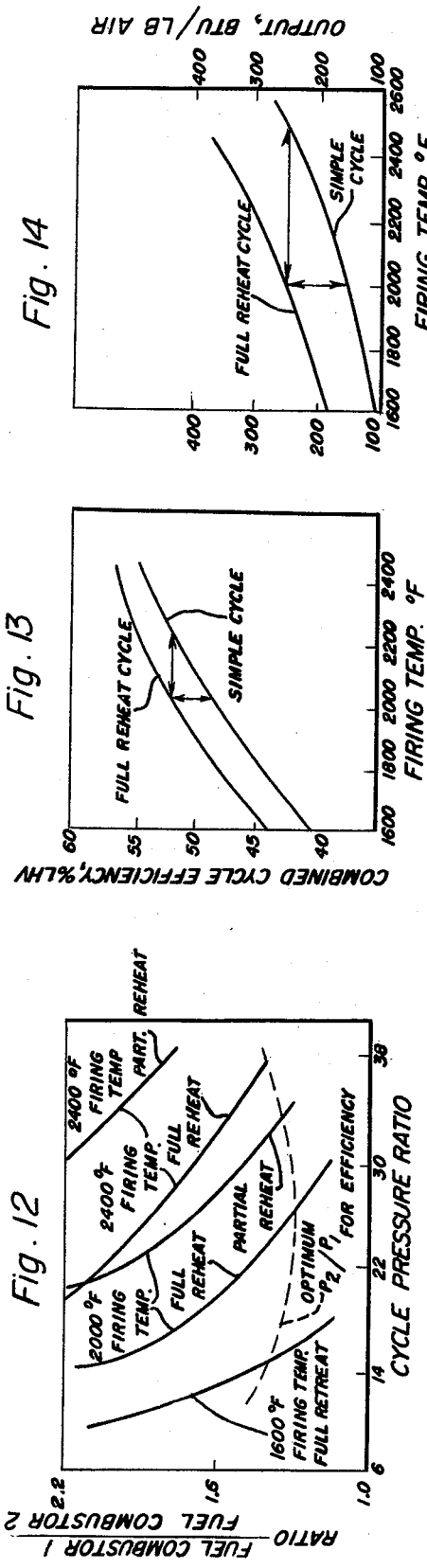
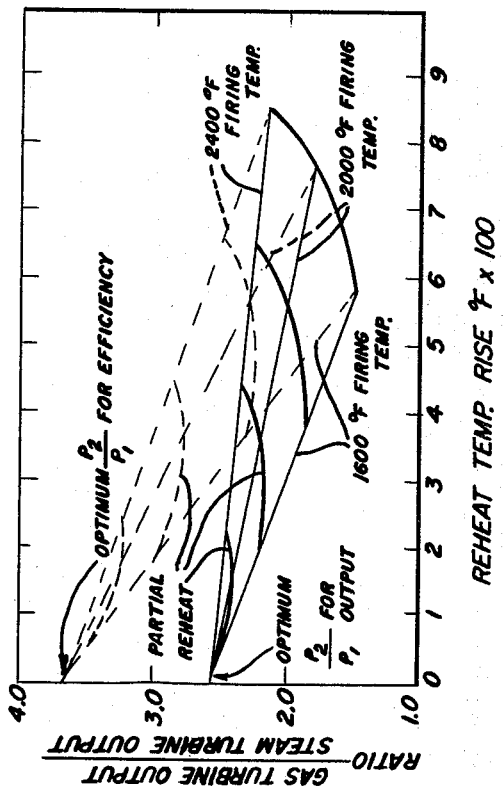
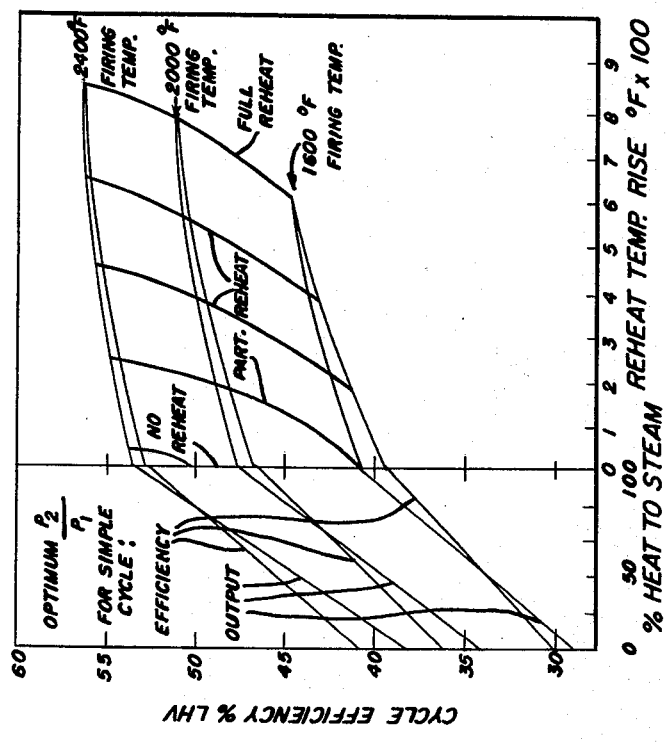

REHEAT GAS TURBINE COMBINED WITH STEAM TURBINE

BACKGROUND OF THE INVENTION

1. Field of the Invention

The invention relates to a method and process for generating useful power. More particularly, the invention provides a combined reheat gas turbine and steam turbine cycle wherein a reheat combustor accepts a heated and compressed gas produced by a conventional gas generator, adds fuel and delivers reheated gas to a power turbine for directly generating power, exhaust gas from the power turbine forming superheated steam to drive the steam turbine. Alternatively, the reheat combustor for reheating the gas generator exhaust gas incorporates heat exchange means for superheating steam therein prior to delivery of reheated gas to the power turbine and optionally for production of reheated turbine steam for return to the steam turbine to furnish additional power thereto.

2. Description of the Prior Art

Research and development is currently being directed toward many configurations of power systems involving gas turbines because of the growing awareness of impending world energy shortages. The present invention relates to the need for focus technical attention to the reheat cycle and with use of the apparatus and processes of the present invention, the reheat gas turbine cycle and combined gas reheat and steam reheat cycle can appreciably increase power plant thermal efficiency to approximately an over-all 50% efficiency level or higher.

The reheat gas turbine cycle itself is well-known and has received considerable attention over the years, particularly in Europe. A regenerator has been used to heat a compressor's discharge air to improve cycle efficiency, and intercooling has been suggested for the same purpose. It is known that reheating can increase power output by 35 to 40%, but without use of regeneration, over-all cycle efficiency is degraded.

Another example of a reheat gas turbine cycle presently employed is the afterburner of a jet engine for aircraft use, such as in military aircraft and in certain commercial supersonic planes. The jet reheat cycle has been developed to get reliable service in applications where augmented power output is required for a short or limited time. The greatly increased power output comes at the expense, however, of markedly increased fuel consumption, owing to which, commercial applications have gone to efficient high bypass ratio fan jets for subsonic flight. Technology developed therefrom has made available second generation high-ratio high-firing temperature gas generators for industrial applications.

Yet, despite the existence of known technology, combined cycle power plants, such as those which utilize the processes and apparatus of the present invention, have not been developed. Attention has not been given to reheat gas turbine combined steam turbine cycle power plants because it has been thought that the degradation in efficiency of the reheat cycle would not offer an advantage, and also that increased fuel consumption would result. However, as will be pointed out hereinafter, thought must be given to the existence of higher level heat available in the exhaust and the over-all entropy changes as well as the concept of extracting maximum work at the high working fluid temperature levels possible with the present invention to obtain highest efficiency. Another explanation of the failure of others to utilize a reheat cycle process is the feeling that greater complication and cost of controls, and additional burner, compatibility of nozzle area, start-up procedures, and the like, would offset any advantage in specific power output, particularly at a higher fuel consumption.

Yet another reason can be cited for the failure of others to point in the direction of present invention. Aircraft derived gas turbines offer an advantage in potential physical arrangement for the reheat cycle in that a reheat combustor can be readily added between the gas generator and the power turbine, whereas conventional industrial or heavy duty gas turbines are ordinarily single shaft units for power generation, such conventional units not readily lending themselves to addition of a reheat burner. Moreover, second generation aircraft gas turbines fire at elevated temperatures and utilize high compression ratios suitable for reheat cycles, while industrial units, because of a single shaft configuration, are limited to lower ratios.

With the appearance of an increasing number of high-temperature and high-pressure-ratio gas turbines which lend themselves to reheat cycles, use of such equipment according to the process and teachings of the present invention becomes technically feasible, affording a practical utility for the generation of useful power, such as electrical power.

SUMMARY OF THE INVENTION

The invention contemplates a process and apparatus for generating useful power by utilizing a combined reheat gas turbine and steam turbine cycle. The process comprises generating a compressed, heated gas in a gas generator arrangement, and then reheating the exhaust gas for generation of power in a second turbine, followed by extraction by heat exchange of the useful energy in the exhaust gas from the second turbine to indirectly power a steam turbine through generation of steam.

Accordingly, it is an object of the invention to provide a process for reheating gas generator exhaust gas to generate power in a power turbine, followed by extraction of energy from the power turbine exhaust to generate steam for powering a steam turbine.

A further object of the invention is to provide a reheat gas turbine including a reheat annular combustor with which an associated gas generator is easily installable and easily removable for servicing.

Still another object of the invention is to provide a reheat gas turbine including a reheat combustor with a better and longer diffuser having a two-shaft construction, the reheat combustor being associated with a gas generator in such a manner so as to produce an axial flow of gas throughout for lower pressure loss, which results in higher over-all operational efficiency.

Also contemplated within the scope of the invention is a combined reheat gas turbine and steam turbine cycle for production of useful power wherein; superheated steam is produced by heat exchange in the reheat combustor and reheated gas passing therethrough drives a power turbine for direct production of useful power. The superheated steam produces useful power by driving a steam turbine. Optionally, the combined cycle can include provision of additional heat exchange means in the combustor cavity for reheating exhaust steam produced by the steam turbine and reintroducing the reheated steam into the steam turbine.

An important object of heating the steam in the combustor cavity is to shift the heat load from the heat recovery boiler to the reheat combustor thus allowing a minimum heat recovery boiler stack temperature; that is a minimum stack loss and a higher cycle efficiency. This shift in heat load also affords greater temperature differentials between the exhaust gasses and the boiling water in the evaporator and the preheated water in the economizer to reduce back pressure and to reduce the heat exchange tube surface required and thus lower boiler size and cost.

Accordingly, yet another object of the invention is to provide a combined reheat gas turbine combustor cavity which includes a steam heat exchanger, the combustor cavity delivering reheated gas to a power turbine and simultaneously transferring heat by heat exchange to a steam system for powering a steam turbine.

A further object of the invention is to operate a combined reheat gas turbine and steam turbine cycle at pressure ratios and temperatures unique for such combined cycle providing a high cycle efficiency.

Still a further object of the invention is to provide optimum control of nitrogen oxide emissions with two burners having different ratios of air and fuel, or by injection of water or steam into the reheat burner.

Another further object of the invention is to provide a process of operating a reheat combustor cavity in which steam superheater and reheater coils are placed.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic view of a gas generator with a tandem reheat gas power turbine driving an electric generator, along with a steam turbine driving a second electric generator in a combined reheat gas power turbine and steam turbine cycle.

FIG. 2 is a side elevational view, partly in diagrammatic section, of the axial flow reheat gas turbine of the present invention illustrating a gas generator with an associated second reheat combustor.

FIG. 3 is a schematic view of a combined reheat gas turbine and steam turbine cycle in which the reheat combustor cavity associated with the reheat gas power turbine and provides for steam superheating and steam reheating. A tandem power turbine arrangement is shown.

FIG. 4 is a longitudinal sectional view of an axial flow reheat combustor cavity for effecting gas reheating, steam superheating and steam reheating.

FIG. 5 is a transverse sectional view of the combustor of FIG. 4 showing in addition details of the mounting support and gib key.

FIG. 6 is an enlarged transverse sectional view of a tube for superheating steam and/or reheating in the combustor cavity of FIG. 4.

FIG. 12 is a graph showing the fuel ratio of the first combustor and the reheat combustor as a function of cycle pressure ratio for various firing temperatures.

FIG. 13 is a graph showing combined reheat gas turbine and steam turbine cycle efficiency as a function of firing temperature for a full reheat cycle and for a simple cycle.

FIG. 14 is a graph showing the combined output as a function of firing temperature for both a simple cycle and a full reheat cycle gas turbine.

FIG. 15 is a graph of combined cycle efficiency showing the percentage conversion of heat to steam under the optimum pressure ratio for simple cycle efficiency and output, for three firing temperatures in the left-hand portion of FIG. 15, and combined cycle efficiency for optimum pressure ratios for reheat gas cycle efficiency and output as a function of reheat temperature rise for three firing temperatures in the right-hand portion of FIG. 15.

FIG. 16 is a graph showing the ratio of gas turbine output to steam turbine output as a function of reheat temperature rise for the optimum pressure ratio for efficiency and the optimum pressure ratio for output, for various firing temperatures and for full and partial reheat.

DESCRIPTION OF THE PREFERRED EMBODIMENTS

Figure 8:
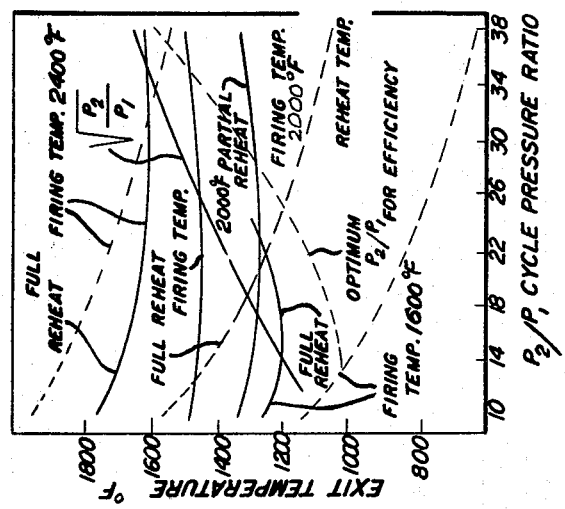
FIG. 8 is a diagrammatic view of the heat balance in a reheat bottoming cycle for the same steam conditions used in calculations presented herein.

In FIG. 1, a schematic diagram of the combined cycle of the present invention shows gas generator 20 which receives air through inlet line 22, producing compressed air by compressor 24, which is driven through shaft 26 by gas generator turbine 28, which is powered by gas produced in first combustor 30 from air entering combustor 30 through line 32 and fuel entering combustor 30 through fuel line 34. Reheat or second combustor 36 receives exhaust from gas generator turbine 28 through reheat inlet line 38 and discharges reheated gas through line 40 to power turbine 42, which drives first electric generator 44 directly by shaft 46. A second identical power turbine 42' can be used in tandem with power turbine 42 to drive electrical generator 44 by shaft 46'. Reheat gas output leaves power turbine 42 through exit line 48 and passes into heat exchanger 50 prior to discharge through stack line 52. Exit gases through exit line 48 pass through three stages of heat exchanger 50, the first being superheater 54, where superheated steam is produced through superheat line 56; the second being evaporator 58, where water from storage drum 60 and recycled water is evaporated in line 62; and the third being economizer 64. In economizer 64, recycled water entering from line 66 is warmed for evaporation in line 59 before entering evaporator 58. Superheated steam leaving superheater 54 through line 56 enters and drives steam turbine 68, which directly powers second electric generator 70 through shaft 72. Condensate from steam turbine 68 is formed and collected in condenser 76 and pumped by condenser pump 78 through line 80, along with steam formed directly in turbine 68, through line 82, to heater 86, the output of which is fed by boiler feed pump 88 to recycle line 66. It is to be particularly noted that a tandem arrangement of gas generator and turbine combination can be utilized, with first electric generator 44 being powered by two such arrangements, the combined reheat exhaust gas output of which feeds into exit line 48. It should further be noted that each of the individual components of the system shown in FIG. 1 with the exception of the reheat combustor is conventional and only the combined arrangement including the reheat combustor leading to the advantages and efficiencies disclosed in the present invention, are intended to be described as new.

In the schematic diagram of FIG. 3, gas generator 20 functions in the same manner as the gas generator described for FIG. 1, and steam turbine 68, condenser 76, heater 86, and pumps 78 and 88 function in the same manner as in FIG. 1. However, the output of gas generator 20 enters cavity 90 through line 38, cavity 90 being, a combined reheat combustor and superheater, reheating exhaust gas from line 38 of gas generator 20 and discharging reheated gas through line 40 to drive power turbine 42, which drives first electric generator 44 by means of shaft 46. Cavity 90 also superheats the output from evaporator 58, entering cavity 90 through line 92 and leaving through line 56, for driving steam turbine 68. Reheating of steam also occurs in cavity 90, the steam entering cavity 90 through line 94 and leaving cavity 90 through line 96 to enter steam turbine 68. Steam turbine 68 drives second electric generator 70 through shaft 72, and recycling of condensed output through line 66 occurs through economizer 64 and evaporator 58. A tandem power turbine arrangement equivalent to that shown in FIG. 1 can be used in the combined cycle of FIG. 3.

FIG. 2 is a representation of the reheat gas turbine cycle of the present invention including gas generator 20 in association with power turbine 42. Gas generator 20 is made up of combustor 30 and air compressor 24, which has stages 100, 102 and 104, 106 and 108 of a five-stage low pressure section, as well as stages 110 and 112, which are representative stages of a 14-stage high pressure section. Combustor 30 discharges compressed heated air to stages 114 and 116 of a two-stage high pressure section and stage 118 of a one-stage low pressure section. Shaft 26 connects compressor 24 with gas generator turbine 28. A number of high temperature and high pressure ratio gas turbines are now on the market, gas generator 20 in FIG. 2 illustrating the second generation LM 5000 Model, other model designations currently available commercially including the LM 2500, JT 9, RB-211, Spey, and the Mars.

Gas generator 20 in FIG. 2 is coupled with reheat combustor 36, showing fuel line 35, fuel nozzle 120, annular combustion region 122, diffuser 124, and the combustion region of power turbine 42. It is to be understood that a plurality of fuel nozzles 120, arranged concentrically produce the annular flow of reheat gas which drives power turbine 42.

Alternatively, the output of gas generator 20 can feed cavity 90 shown in FIGS. 4 and 5, for performing gas reheat and both steam reheat and superheating functions. Gas from diffuser 130 passes around struts 132 and is heated in combustion region 134 as fuel nozzle 136 discharges fuel for combustion therein. Fuel enters cavity 90 through fuel line 138 and is ignited by spark plug 140. Superheat and steam reheat helical coils 142 are shown somewhat schematically in FIG. 4, having the configuration of FIG. 6 in enlarged detail. Boiler steam header 144 furnishes steam through line 92 to cavity 90, and after boiler steam has traversed its helical path through cavity 90, it leaves cavity 90 through line 56 for collection in boiler steam header 148. Reheat steam leaves cavity 90 through reheat steam outlet line 96, entering reheat steam header 146. Boiler steam enters cavity 90 through line 92 and header 144, while boiler steam exits cavity 90 through line 56 and header 148. Reheat steam enters cavity 90 through reheat steam inlet line 94 from header 150. Insulation 152 surrounds cavity 90, diffuser 130, headers 146, 148, 144 and 150, and also surrounds inlet power turbine nozzle 154. Exit gases pass through inlet nozzle 154 to drive turbine 42, passing next to power turbine first stage nozzle 156 as shown in FIG. 4. The inside surface 157 of inlet nozzle 154 is in the shape of a nose of a bullet, while outside bell mouth 196 has the shape shown. FIG. 6 shows streamlined fabricated superheat tube 142 containing perforated sheath 158 surrounding three tubes 160, 162 and 164 for containing superheated and/or reheated steam, the respective diameters varying according to the flow rates and throughput demanded of each component.

Figure 7:
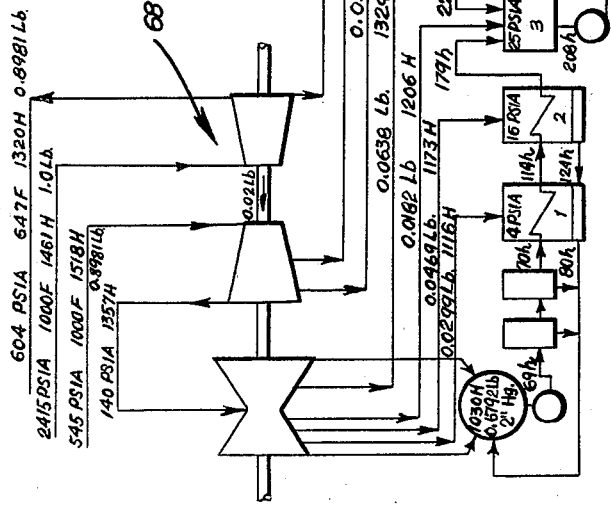
FIG. 7 is a diagrammatic view of the steam path heat balance in a conventional reheat steam turbine power plant cycle.

The advantages of the cycle of the present invention, such as is accomplished with the combined superheating and reheating apparatus of FIGS. 4, 5 and 6, is illustrated by the established and industry accepted data of the steam path heat balance of a conventional reheat steam turbine with steam conditions of 2400 psig and 1000/1000° F. for reference shown in FIGS. 7 and 8. The steam path heat balance in FIG. 8 can be used in accordance with the combined cycle of the present invention and, compared with the heat balance of a conventional reheat steam turbine in FIG. 7. Certain assumptions have been made in developing the data of FIGS. 7 and 8, for the sake of concreteness. Both steam turbine heat balances take into account the boiler feed pump input, but a loss of 3% should be applied to each to take into consideration steam leakage, mechanical losses and the hydrogen-cooled electric generator losses. By calculating the net output, FIG. 7 shows 497 BTU's, and by determining the net input from the indicated data, a net input of 1165 BTU's is seen to result, giving a net efficiency of 42.7% and applying an established boiler efficiency of 89% along with the 3% losses given above results in a conventional power plant cycle efficiency of 36.86%. Similarly, from FIG. 8, a gross output of 581 BTU's is obtained from a net input of 1437

BTU's, giving a net efficiency of 40.43% and applying the 3% losses given above results in a cycle efficiency of 39.22% where no boiler efficiency is applicable. Utilizing these data, and making the 16 assumptions listed in Table I, the cycle efficiency of the combined cycle with additional steam reheat can be calculated as shown in Table II.

The steam turbine is also a 100,000 KW capacity, with the steam output for the two boilers and the two gas turbine superheaters feeding the one steam turbine:

TABLE II

| | Steam Reheat Cycle Efficiency | | | | | |
|---|---|---|---|---|---|---|
| Mode | Gas Generator Fuel Input LHV BTU/HR × $10^6$ | Reheat Fuel Input LHV BTU/HR × $10^6$ | Gas Turbine Net Output KW | Steam Turbine Net Output KW | Total Net Output KW | Net Cycle Eff % |
| Continuous | 296.24 | 337.75 | 43,608 | 48,234 | 91,842 | 49.44 |
| Electric Base | 320.16 | 334.14 | 46,601 | 49,313 | 95,914 | 50.03 |
| Peak | 336.72 | 328.22 | 48,750 | 49,561 | 98,311 | 50.46 |

Results of Table II are to be compared with a similar arrangement in which steam reheat is absent but a reheat gas turbine, such as is shown in the schematic arrangement of FIG. 1, is utilized in which two model

TABLE I

| | Assumptions in Efficiency Calculations- Gas Generator and Steam Reheat | | |
|---|---|---|---|
| No. | Item | Value | Units |
| 1. | Inlet Pressure | 14.7 | psia |
| 2. | Ambient Temperature | 60 | degrees F. |
| 3. | Power Turbine Efficiency | 87 | percent |
| 4. | Reheat Gas Turbine Combustion Loss | 3 | percent |
| 5. | Steam Superheater Combustion Loss | 1 | percent |
| 6. | Steam Reheat Combustion Loss | 1 | percent |
| 7. | Reheat Combustor Pressure Drop | 3 | percent |
| 8. | Power Turbine & Generator Loss | 2 | percent |
| 9. | Steam Turbine & Generator Loss | 3 | percent |
| 10. | Boiler Radiation & Blowdown Loss | 2 | percent |
| 11. | Constant Reheat Firing Temperature | 1800 | degrees F. |
| 12. | Inlet & Back Pressure Loss | 4/6 | inches of water |
| 13. | Condenser Pressure | 2 | inches Hg absolute |
| 14. | Liquid Fuel with 18,400 BTU/lb. LHV | | |
| 15. | Keenan and Kaye Air Tables for 200% Theoretical Air | | |
| 16. | Steam Heat Balance, FIG. 8. | | |

The cycle analysis can be carried out for three modes of operation, namely, continuous, electric base and peak operation, giving the results shown in Table II for half plant capacity. In this arrangement, two model LM 5000 gas generators are mounted to a single hydrogen-cooled electric generator of 100,000 KW capacity, the power turbines having oppositely rotating power shafts.

LM 5000 gas generators are mounted in the same manner as above. Table III presents the assumptions applied in the calculations of the combined cycle efficiency:

TABLE III

| | Assumptions in Efficiency Calculations Gas Generator Reheat Only. | | |
|---|---|---|---|
| No. | Item | Value | Units |
| 1. | Ambient Temperature | 60 | degrees F. |
| 2. | Inlet Pressure | 14.7 | psia |
| 3. | Steam Pressure | 1250 | psig |
| 4. | Steam Temperature | 900 | degrees F. |
| 5. | Feed Water Temperature to Boiler | 250 | degrees F. |
| 6. | Steam Turbine Efficiency | 80 | percent |
| 7. | Power Turbine Efficiency | 87 | percent |
| 8. | Reheat Gas Turbine Combustor Loss | 3 | percent |
| 9. | Reheat Combustor Pressure Drop | 3 | percent |
| 10. | Power Turbine & Generator Loss | 2 | percent |
| 11. | Steam Turbine & Generator Loss | 3 | percent |
| 12. | Boiler Radiation & Blowdown Loss | 2 | percent |
| 13. | Constant Reheat Firing Temperature | 1800 | degrees F. |
| 14. | Inlet & Back Pressure Loss | 4/10 | inches of water |
| 15. | Condenser Pressure | 2 | inches Hg absolute |
| 16. | Keenan & Kaye Air Tables for 400% Theoretical Air | | | and Table IV shows the results of the calculations of cycle efficiency under three modes of operation for half plant capacity.

TABLE IV

Gas Turbine Reheat Cycle Efficiency. Half Plant Capacity

| Mode | Gas Generator Fuel Input LHV BTU/HR × $10^6$ | Reheat Fuel Input LHV BTU/HR × $10^6$ | Gas Turbine Net Output KW | Steam Turbine Net Output KW | Total Net Output KW | Net Cycle Eff % |
|---|---|---|---|---|---|---|
| Continuous | 296.24 | 171.57 | 43,002 | 23,442 | 66,444 | 48.69 |
| Electric Base | 320.16 | 162.57 | 45,969 | 23,814 | 69,783 | 49.34 |
| Peak | 336.72 | 155.90 | 48,083 | 23,734 | 71,817 | 49.76 |

The three modes of operations for which the calculations above are presented are defined by the new International Standard ISO/DIS-3977 for gas turbines, and are as follows. The continuous mode of operation represents continuous or base load operation typical of pipeline service, process applications or electric power generation up to 8700 hours per year with infrequent starting greater than 100 hours per start. The electric base mode of operation refers to longer duration of mid-range electrical power generation, with process applications up to 4000 hours per year and with up to eight hours per start. The peak mode of operation refers to short duration intermittent type of operation as occurring typically in electrical power generation for peak load demands, where operation should normally be limited to 500 hours per year and up to two hours per start.

The assumptions in the calculations above and used in the cycle are based on figures for the Model LM 5000 gas generator obtained from the manufacturer after the first second generation unit was thoroughly tested. Characteristics of the LM 5000 gas generator are shown in Table V for base load ratings of 60° F. and 14.7 psia inlet pressure:

TABLE V

Characteristics of Gas Generator.
Base Load Ratings - 60° F. and 14.7 Psia Inlet

| | LM5000 |
|---|---|
| Cycle Pressure Ratio $P_2/P_1$ | 29 |
| Exhaust Flow #/sec. | 272 |
| IGHP × $10^3$* | 50.00 |
| Cycle Eff. (IGHP)* LHV % | 43.0 |
| Firing Temp. F. | 2,100 |
| Gas Generator Ex Pressure Psia | 56.10 |
| Gas Generator Ex Temp. F. | 1,215 |

*Isentropic Gas Horsepower for 100% Expansion Efficiency.

It is clear from comparison of the results of Table II and Table IV that steam reheat generates an over-all power plant efficiency approaching or exceeding 50% LHV when burning the distillate fuel in the apparatus of FIG. 4. Even without incorporation of the superheater in the second combustor, it is possible with an arrangement such as that of FIG. 2 or a process shown in FIG. 1 to obtain net cycle efficiencies approaching or exceeding 49%. These efficiencies represent improvements over the efficiencies obtainable with use of conventional electric power generating equipment, and can lead to considerable cost savings in actual operation. A simplified economic evaluation for half plant capacity and one power turbine making certain reasonable assumptions as to unit size, fuel cost, and the results of earlier calculations, the economic data of Table VI provide a measure of the degree of commercial success expectable with both the reheat gas turbine and with the reheat gas turbine combined with the reheat steam turbine:

TABLE VI

Comparative Economic Analysis of Units Utilizing Reheat Cycles.

| Unit | Cycle Eff. LHV | % Inc. Eff. | % Fuel Consump. | Fuel Cost* $/yr. × 10 | Savings* $/yr. $10^6$ | Savings* $ × $10^6$/ 5 yrs | Savings* $ × $10^6$/ 5 yrs. |
|---|---|---|---|---|---|---|---|
| Conventional Combined Cycle | 44 | Base | 100 | 12.41 | Base | Base | — |
| Reheat G.Turb./S.Turb. (FIG. 2) | 48.5 | 10.2 | 90.7 | 11.26 | 1.15 | 5.75 | Base |
| Reheat G.Turb/Reheat S.Turb. (FIG. 4) | 49.5 | 12.5 | 88.9 | 11.03 | 1.38 | 6.90 | 1.15 |

*Based on Fuel Cost of $2.50 × $10^6$ BTU LHV.

Table VI indicates that there would be generation of 5.75 million dollars in five years for amortization of the capital cost of the reheat power turbine, while an additional 1.15 million dollars would be made available in five years of operation to amortize the capital cost of a reheat gas turbine combined with a reheat steam turbine system. It should further be noted that a savings in the heat recovery boiler would result, since the boiler would be simpler and have less surface and greater mean temperature difference. Moreover, the two superheaters would not be duplicated in the heat recovery boiler, effecting even further savings. These figures which are based on the standard industry accepted combined cycle available today having a cycle efficiency of 44% LHV, provide a clear indication of the degree of commercial success expectable from the two embodiments of the present invention, but the existence of uncertainties, such as rising fuel costs, limited future oil supply, coal fuel development, high interest rates, power rate increases, and other uncertainties, could result in a shift favoring the embodiments of the present invention to an even greater extent in the future.

Considerations incident to the reheat turbine combustor of the present invention are the following. Combustor 36 incorporates an annular liner 121 flaring outwardly to an exit plane 170 at power turbine 42. Fuel nozzles 120 are disposed in liner 121 and have orifices 123 equally spaced on an orifice plane and separated by a chord width having a chord width diameter with respect to axis 172 of the entire arrangement. Fuel nozzles 120 are directed outwardly along a pitch line forming a pitch angle with respect to axis 172, the intersection of the pitch lines with exit plane 170 having a pitch line diameter in a certain preferred ratio to the chord diameter. This ratio is determined by calculating the volume ratio of gases at the exit plane and at the orifice plane by applying Boyle's law, $PV = WRT$. Under typical conditions, the output gas at the exit plane of the gas generator combustor 30 has a temperature of approximately 2100° F. (1149° C.) and a pressure of approximately 30 atmospheres, while the exhaust gas at the orifice plane of the reheat combustor 36 has a temperature of approximately 1800° F. (982° C.) and 3.75 atmospheres. Accordingly, a volume ratio of 6.9 is obtained, and this value is preferably increased slightly to produce a lower pressure drop combustor 36.

Moreover, the length of diffuser 124 and combustor 36 should be about 60% greater than the diffuser of a conventional power turbine not incorporating combustor 36. Preferably, diffuser 124 and in the alternative apparatus, diffuser 130, has a length of at least about four feet to prevent separation and resulting turbulence of incoming gas. Of course, diffuser 124 or 130 will be constructed of proper angular change and cross-sectional area change to accomplish the above. The power turbine diameter can be slightly greater, and the nozzle chord width adjusted to give approximately 1.35 times the first stage power turbine nozzle area.

Referring again to FIGS. 4 to 6, the required diameter of cavity 90 is about 10 feet, which takes into account a gas velocity of about 100 feet per second and the increase in area required to accommodate superheater tubes 142, assuming an average gas temperature of about 2000° F. (1093° C.). The increase in area to accommodate tubes 142 is about 70%. The length of cavity 90 can vary somewhat according to the surface area required for superheating, and a workable length is about 18 feet. Outer shell 176 is fabricated in sections about two feet long and bolted together at joints 178 so that superheater coils 142 can be inserted properly. The outer shell 176 and associated pipes 56, 92, 94, 96, etc., can be disconnected from headers 144, 146, 148 and 150 at flanges 57, 93, 95, 97, etc., for removal of the two foot sections of outer shell 176. Superheater tubes 142 are wrapped around in a manner to form helical coils of specific configurations, such as that illustrated in FIG. 5. Coils 142 form an annular combustion cavity and control air flow to burner 136. Downstream from burner 136 coils 142 then temper hot combustion gases and distribute them through more coils 142. Combustion cap 155 can also be seen.

In the arrangement shown in FIG. 5, cold steam enters at the bottom of cavity 90, circulates through tubes 142 and then exits at the top for each superheater. Shell 176 can be center-line supported by supporting mounts 180 to control expansion and to maintain a reasonable center-line elevation with respect to foundation 182 and to satisfy axial alignment of gas generator 20 and power turbine 42. Furthermore, gas generator 20 can be quickly and readily removed to service cavity 90.

Superheater coils 142 are individually configured so that each tube length is balanced for steam pressure drop and for equal radiant and convection heat absorption area. Equal pressure drop is needed for flow distribution and the balance or radiation and convection heat absorption provides good superheater temperature control, particularly at partial load conditions. The gas side pressure drop of conventional superheaters is about two inches of water per superheater, amounting to less than a one percent drop for the two superheaters in an atmospheric aspirated boiler. This percent pressure loss can be applied to superheater coils 142 operating at approximately 3.75 atmospheres. Tubes 142 are fabricated with three different sizes 160, 162 and 164, and are streamlined with perforated leading and trailing edge overlays 158 to minimize pressure drop to control the hot gas flow as illustrated in FIG. 6. The perforations allow proper temperature gas to enter and reach the interior surfaces of tubes 160, 162 and 164, thereby increasing considerably the effective heat transfer area. Diffuser 130 from gas generator 20 to cavity 90 has an extra length, and the gas generator assisted by the angle of the struts 132 imparts a swirl to gas passing therethrough to give the gas a longer flow path to assist in diffusion of the gas entering cavity 90.

Power turbine 42 has a nozzle consisting of an outer cone or bell mouth 196 and inner bullet-shaped nose 157 to reduce inlet loss from cavity 90 to power turbine 42, where velocity of gas is increased.

Data are shown in Table VII comparing a non-heat steam turbine cycle and a reheat steam turbine cycle each combined with the reheat gas turbine cycle, where pertinent data on the gas generator power turbine and boiler are included. As in previous comparisons, calculations have been made for three modes of operation, namely, continuous, electric base and peak. It is seen that under all modes of operation, the cycle efficiency is improved by use of steam reheat, and total net output is increased substantially.

TABLE VII

Half Plant Capacity
Non-Reheat Steam Turbine Steam Conditions 1250 pisg - 900° F.
Reheat Steam Turbine Steam Conditions 2400 psig - 1000/1000° F.
Average Gas Generator Figures Presented

| | | Continuous | | Electric Base | | Peak | |
|---|---|---|---|---|---|---|---|
| | | No STRH | STRH | No STRH | STRH | No STRH | STRH |
| 1. | GG IHP $\times 10^3$ | 50.0 | | 55.0 | | 59.1 | |
| 2. | GG Firing Temperature °F. | 2100[1] | | 2250[1] | | 2400[1] | |
| 3. | GG Exhaust Flow lb./Sec. | 272 | | 283 | | 289 | |
| 4. | GG Exhaust Temperature °F. | 1215 | | 1262 | | 1295 | |
| 5. | GG Exhaust Pressure psia | 56.10 | | 58.60 | | 61.0 | |
| 6. | GG Fuel Cons.BTU/HR $\times 10^6$ LHV | 296.24 | | 320.16 | | 366.72 | |

TABLE VII-continued

Half Plant Capacity
Non-Reheat Steam Turbine Steam Conditions 1250 pisg - 900° F.
Reheat Steam Turbine Steam Conditions 2400 psig - 1000/1000° F.
Average Gas Generator Figures Presented

|  |  | Continuous | | Electric Base | | Peak | |
|---|---|---|---|---|---|---|---|
|  |  | No STRH | STRH | No STRH | STRH | No STRH | STRH |
| 7. | Fuel Cons.BTU/HR × 10⁶ LHV | 169.55 | 337.75 | 162.57 | 334.14 | 155.90 | 328.22 |
| 8. | Tot.Fuel Cons.BTU/HR × 10⁶ LHV | 465.79 | 633.99 | 482.73 | 654.30 | 492.62 | 664.94 |
| 9. | PT Ex.Flow to Boiler lb./Sec. | 274.5 | 277.2 | 285.4 | 288.1 | 291.3 | 294.0 |
| 10. | PT Ex. Temp. to Boiler °F. | 1269 | 1281 | 1253 | 1266 | 1240 | 1252 |
| 11. | PT Expansion Ratio | 3.702 | | 3.867 | | 4.025 | |
| 12. | PT Net Output BTU/LB. Flow | 151.3 | 152.2 | 155.8 | 156.5 | 159.7 | 160.4 |
| 13. | Steam Flow lb./HR ×10³ | 197.5 | 292.1 | 200.5 | 298.6 | 199.9 | 300.1 |
| 14. | Boiler Stack Temp. °F. | 328 | 300 | 335 | 300 | 341 | 300 |
| 15. | Air/Fuel Ratio lb. Air/#Fuel | 38.40 | 28.21 | 38.42 | 28.34 | 38.32 | 28.39 |
| 16. | PT Net MW Output | 43.00 | 43.61 | 45.97 | 46.60 | 48.08 | 48.75 |
| 17. | ST Net MW Output | 23.44 | 48.23 | 23.81 | 49.31 | 23.73 | 49.56 |
| 18. | Total Net MW Output | 66.44 | 91.84 | 69.78 | 95.91 | 71.81 | 98.31 |
| 19. | Cycle Efficiency LHV % | 48.69 | 49.44 | 49.34 | 50.03 | 49.76 | 50.46 |

*Estimated Values.
Notations:
STRH - Steam turbine reheat
GG - Gas generator
IHP - Isentropic horsepower
PT - Power Turbine
ST - Steam turbine
MW - Megawatts
LHV - Lower heating value It should be particularly noted that in both embodiments of the present invention, axial flow through the second combustor is present, giving rise to lower pressure loses which translate into higher over-all efficiency. Moreover, in both embodiments, a longer diffuser is possible between the gas generator and second combustor. In the case of the reheat gas combustor, a two-shaft design leads to higher efficiency. In the case of the cavity for gas reheat, combined with steam reheat, the long diffuser provides for maximum velocity head recovery.

Referring again to FIG. 4, the cylindrical construction of cavity 90 is apparent, leading to equal and even loop, that is, pressure vessel, stress. Coils 190 about the periphery of the inside of cavity 90 define and in effect form the combustion chamber thereof, and inside coils 190 serve as an insulator to shell 176. Moreover, inner coils 142 are arranged about the combustion region 134 to control gas flow and mixing. Plenum 192 serves to stabilize eddy currents before gas enters through inlet nozzle 154 of power turbine 42. Inlet nozzle 154 is configured to reduce pressure loss, through the shape of outside bell mouth 196 and bullet nose 157. Gib keys 198 permit control and maintenance of axial alignment during operation, and flex legs or trunnions (not shown) allow for axial expansion. Annular combustion caps 155 when used in combination with burner fuel nozzles 136 provide for even temperature distribution. The cylindrical construction of cavity 90, with axial flow of gas therethrough, allows use of a plurality of gas generator and reheat assemblies to permit adaptation to large scale power plants on the order of 1000 megawatt size.

In view of the lower intermediate pressure generated in reheat cavity 90, lower grade liquid fuels or solid fuels in pulverized or powdered form can be used in burner nozzles 136, such as low energy content gas from coal, coal derived liquids, shale oil, or other liquid fuels, such as Bunker "C" type oil, residual oil, crude oil or coal powder of relatively poor quality and low energy content per unit volume or weight. Further consequences of the lower intermediate pressure of reheat cavity 90 are lower parasitic compresion power losses, capability of using larger power tubrine blades for better cooling and more rugged service due to lower abrasion, erosion and corrosion losses, and a larger over-all power turbine for increased expansion efficiency.

Figure 19:
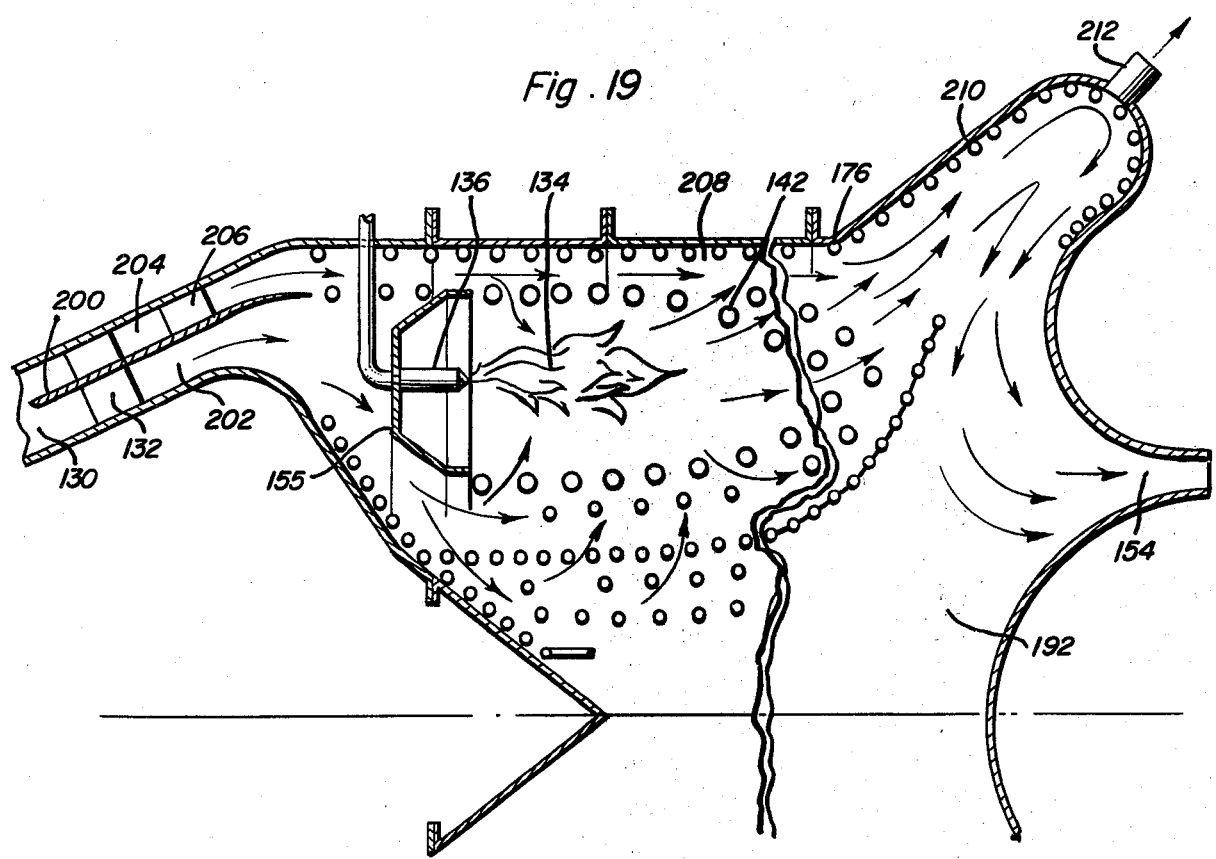
FIG. 19 is a fragmentary sectional view of a modified form of the combustion cavity which can be utilized in the combined cycle of FIG. 3, showing its adaptation for burning of finely divided solid fuel, such as powdered coal.

In the case of burning pulverized or powdered coal in burner 136, diffuser 130 will be equipped as shown in FIG. 19 with circumferential divider 200 to separate incoming gas into an inner stream 202 and an outer stream 204, with outer stream 204 being given centrifugal motion by conventional streamlined turning vanes 206 to impart a greater spinning motion to outer stream 204. The combustion products from combustion of the coal inside cavity 134 are then directed into the outer spinning stream 208 by the pattern of coils 142 for the solid matter to be collected on the outer circumference of shell 176 into collector 210 by centrifugal force and bled off of plenum 192 through line 212. Combustion gas free of solid matter then enters nozzle 154 as described above.

Figure 9:
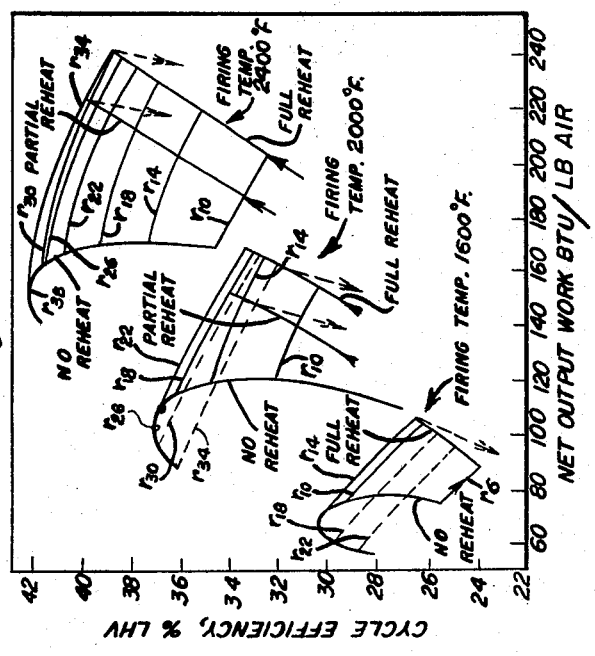
FIG. 9 is a graph showing gas turbine cycle efficiency as a function of net power output for various cycle pressure ratios and firing temperatures for each of three conditions of no reheat, partial reheat and full reheat.

FIG. 9 shows a graph of cycle efficiency as a function of net work output, illustrating the increase of both cycle efficiency and net output with increasing firing temperature, but also showing the dropoff of cycle efficiency while net output increases as reheat proceeds from no reheat to full reheat. In FIG. 9, the subscript designates the pressure ratio, $r_6$ representing a pressure ratio of 6, and $r_{22}$ representing a pressure ratio of 22, for example. It is important to note that for full reheat, the optimum cycle ratio for net output is also the optimum ratio for cycle efficiency. Both rise to a maximum and then fall off sharply. It is the increase in net work output while maintaining a higher cycle efficiency which gives rise to the advantages of the present invention, utilizing the particular structure taught herein to attain higher firing temperature of reheated gas.

Figure 10:
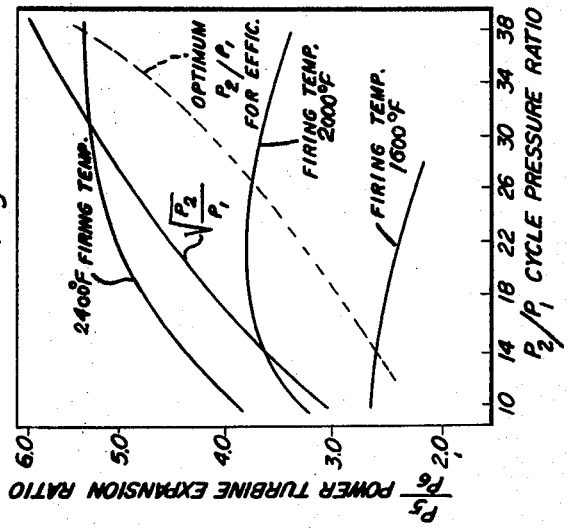
FIG. 10 is a graph showing power turbine expansion ratios as a function of cycle pressure ratios for various firing temperatures of a gas generator combined with a power turbine.

FIG. 10 discloses the effect of firing temperature and cycle pressure ratio, since expansion ratios available for reheat cycles are important in determining combustor size and pressure drop. Intersection of the optimum pressure ratio for efficiency with the curves for three firing temperatures reveals that at 1600° F. (871° C.), the expansion ratio available is only about 2.5, while at 2000° F. (1093° C.), the expansion ratio increases to 3.75, and at the still higher firing temperature of 2400° F. (1316° C.), the ratio increases further to 5.25. Inasmuch as the power turbine expansion ratio is a measure of the efficiency over-all of a power generating system, and the gas generator 20 described as second generation equipment now available commercially and firing at 2000° to 2100° F. (1093° to 1149° C.) continuous load, the reheat cycle of the present invention is decidedly more practical than with first generation gas generators firing at 1600° F. (871° C.), which are seen to produce a rather low power turbine expansion ratio.

Figure 11:
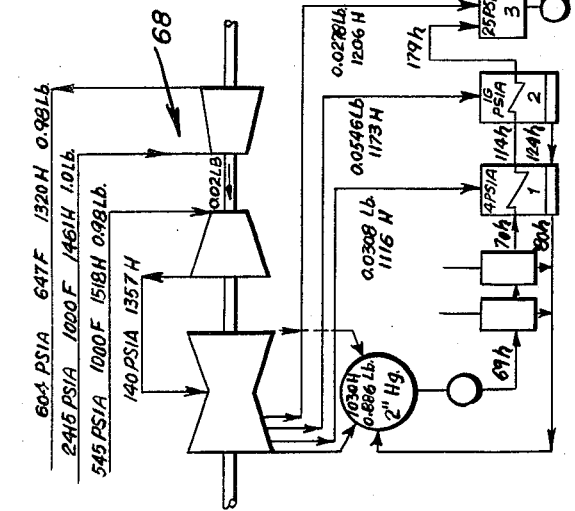
FIG. 11 is a graph showing gas generator and power turbine exit temperatures as a function of cycle pressure ratios for different firing temperatures of a gas generator and associated power turbine.

FIG. 11 shows the effect of another factor to consider in a reheat cycle, namely, the temperature level of gas generator exhaust. FIG. 11 shows the dependence of gas generator and power turbine exit temperatures as a function of cycle pressure ratio, showing exit gas temperature at the gas generator in dashed lines, indicating the strong dependence on firing temperature and the appreciable dropoff as the cycle ratio is increased. Solid lines refer to power turbine exit temperatures. FIG. 11 illustrates that power turbine exit temperatures are not as sensitive to cycle pressure ratios as gas generator exit temperatures. With second generation gas generators, such as that described above in connection with the present invention, the cycle pressure ratios available range from 18 to 30, and the gas generator has a 2000° F. (1093° C.) or higher firing temperature, giving exit temperature within practical limits for reheat cycle. It should be noted that when considering heat recovery, the power turbine exhaust temperature is important. The power turbine exhaust temperature ranges in FIG. 11 are ideal for heat recovery in the combined cycle. It is well-known that the best range of exit temperatures for heat recovery boilers is between 1200° and 1400° F. (649° and 760° C.).

When considering a reheat cycle power turbine, the materials of construction for the exhaust plenum 192 must be carefully considered. High temperature materials, however, are within the state of the art, as is cooling of power turbine blading for the reheat firing temperatures of the present invention.

FIG. 12 discloses another factor to be considered, namely, the amount of fuel to be burned in the reheat combustor compared with the first combustor. In general, the reheat combustor requires less fuel than the first combustor. The proper fuel ratio can be seen from FIG. 12 for the range of cycle pressure ratios of 18 to 30 and for firing temperatures of 2000° F. to fall between about 1.2 and 1.8.

Firing temperature has a decided effect on combined cycle efficiency for both simple and reheat gas turbines as shown in FIG. 13. Increasing the firing temperature from 1600° F. to 2400° F. raises the efficiency from a little over 40% to about 53.5% for the combined simple cycle and from about 45% to a little over 56% for the combined reheat cycle. At 2000° F. firing temperature, the reheat cycle has an efficiency point advantage of about 3.5%, as illustrated in FIG. 13 by the vertical arrows. This represents a 7.4% improvement over the simple cycle efficiency value, which is the equivalent to an increase of about 200° F. in firing temperature, as indicated by the horizontal arrows in FIG. 13. This gain is significant and is worthy of note, considering the high cost of fuel today and projected cost in future years.

It should be noted that any designation of partial reheat in the Figures refers to a reheat firing temperature of 1800° F. The reheat firing temperature of 1800° F. was selected for two basic reasons: first so that lower cost and readily available power turbine blading incorporating so called internal convection-blade cooling can be used instead of more expensive film-cooled blading, and secondly so that the exhaust gases exiting from the power turbine will be at a preferred temperature of about 1250° F. for optimum steam generation, that is, minimum stack temperature, and a lower cost of materials and construction required for the power turbine exhaust plenum. In the future, as the state of the art permits gas turbine firing temperatures and pressure ratios to be increased to provide higher power turbine expansion ratios, the reheat firing temperature would be increased to maintain the optimum 1250° F. temperature range to the heat recovery boiler. At such time the more expensive film-cooled blades would be employed. Such future developments would further increase output and improve cycle efficiency as shown in FIGS. 9 through 15.

An over-all picture of the two combined cycles in terms of cycle efficiency is presented in FIG. 15, showing on the left side the simple cycle gas turbine efficiency for the two optimum conditions of compression ratio for output and efficiency. The efficiency rises as the heat is absorbed by the boiler and converted to work, where 100% of the heat obtainable is recovered. At this point, the simple cycle gas turbine is slowly changed to a full reheat cycle by adding increasing amounts of fuel in the second combustor until firing temperatures are equal. The cycle efficiency rises as the efficiency lines run from left to right.

FIG. 14 illustrates the effect on output for the combined cycle as a function of firing temperature. Output increases substantially as firing temperature rises, and moreover, the reheat output has a slightly sharper rise than the simple cycle output. FIG. 14 is useful in evaluating size and potential cost of equipment. For example, with a 2000° F. firing temperature, the combined reheat cycle is shown to develop an increase of about 95 BTU per pound of air flow over the combined simple cycle, equivalent to approximately 56% more output. This figure is an indicator of the relative physical size of the steam and gas turbines and heat recovery boilers of the two cycles and points to potential cost advantages of the reheat cycle. This statement is made in light of the relatively small change in the output ratio of the gas turbine to the steam turbine as shown in FIG. 16 as reheat temperature rises. A further point apparent from FIG. 14 is that the reheat cycle fired at 2000° F. is equivalent to a simple cycle fired at nearly 2600° F. to generate the same output.

Incorporating the superheat and reheat functions in the gas turbine reheat combustor 90 shifts the heat load away from the heat recovery boiler, economizer 64 and evapoorator 58, and makes it possible to provide a simpler and less costly heat recovery boiler with less tube surface area with large temperature differentials between the exhaust gas and the water/steam. A lower cost heat recovery boiler is apparent with less pressure drop possible.

Figure 17:
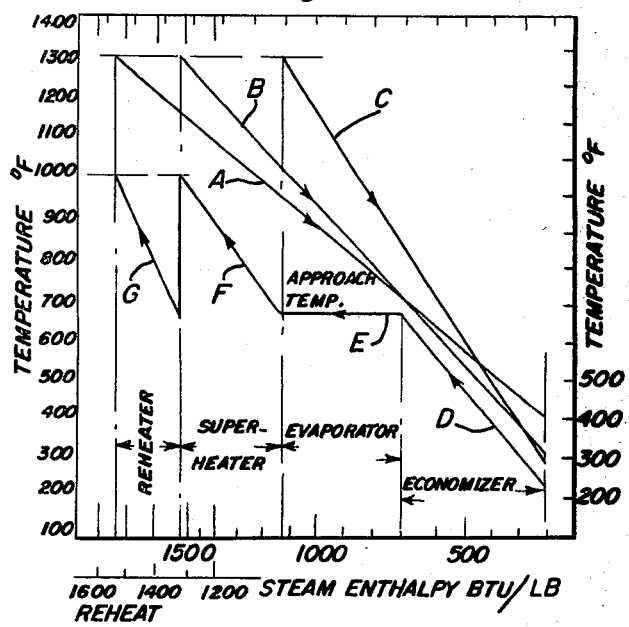
FIG. 17 is a graph showing the relationship of temperature and enthalpy of both the steam being generated and the gas turbine exhaust gases. This graph also presents the effect the boiler pinch point has on final stack temperature.

FIG. 17 illustrates how this is accomplished by showing three conditions: first for superheating and reheating (condition A), second for superheating only (condition B) and third for no superheating or reheating (condition C). This significant heat transfer change and the temperature differential advantages of the third case without superheating or reheating for the heat recovery boiler which is part of the invention are illustrated by comparison of the characteristics of the steam, represented by lines D, E, F and G, as well as the gas characteristics in each respective condition represented by lines A, B and C, respectively. Note that condition C is not subjected to the boiler approach temperature, which is near the assumed practical limit of 50° F. shown in FIG. 17.

Figure 18:
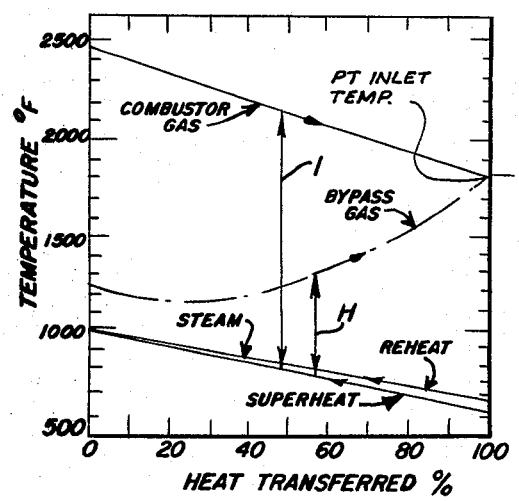
FIG. 18 is a graph showing the temperature differentials between the gas generator bypass gas around the combustor cavity and the steam being superheated. It also shows the temperature differentials between the combustion cavity gas and the steam being superheated.

FIG. 18 illustrates particality of the disclosed arrangement by showing the advantageous temperature differentials for high heat transfer that takes place in the reheat combustor 90 between the reheat gas and the steam coils 142 which is predicated on the specific optimum cycle pressure ratio selected of about 29 and the associated 2100° F. gas generator firing temperature and the 1800° F. reheat firing temperature. It can be noted that the bypass gas entering at about 1250° F. has a mean effective temperature difference with respect to the steam of about 400° F. at a typical location shown at arrow H, whereas the combustor cavity gas exiting at about 2450° F. from cavity 134 has a mean effective temperature difference of about 1200° F. as shown at arrow I. The two vertical arrows H and I illustrate these two areas of heat transfer. It should also be noted that the flame in cavity 134 provides a source of radiant heat that further increases the heat flux available to minimize the surface of tubes 142 and thus minimize pressure drop. FIG. 18 further shows the bypass gas temperature dropping as the gas heats the steam. The gas temperature is shown to rise again after about the 30% heat transfer point as the gas enters downstream combustion zone 134 where the combustion gas mixes with bypass gas.

The considerations outlined in discussion of FIGS. 9 to 18 show the value of gas reheat in improved over-all cycle efficiency, thereby demonstrating and substantiating the advantages of the first embodiment of the present invention, providing for gas reheat. The still greater advantages of the second embodiment of the present invention, providing for gas reheat and steam reheat, are apparent from the discussion and comparisons drawn in connection with discussion of the apparatus illustrated in FIGS. 4 to 6. Accordingly, the process of the present provides for significantly increased reheat cycle gas turbine output, while the reheat gas turbine efficiency is only slightly degraded over the simple cycle for equal firing temperatures. Moreover, the combined cycle incorporating a reheat gas turbine offers significant cycle efficiency improvements for equal firing temperatures, and the output per unit air flow is significantly greater for the combined cycle utilizing the reheat gas turbine, leading to potential cost savings for such a cycle.

Throughout the specification and claims, unless otherwsie specified, cycle efficiencies are expressed in terms of fuel lower heating value (abbreviated LHV), temperatures are given in degrees Fahrenheit, pressures in pounds per square inch absolute, costs in U.S. dollars, power in kilowatts (KW), energy in British Thermal Units (BTU), and parts and proportions in percent by weight. Conversion factors to SIU units are as follows:
BTU=1.055 kilojoules
BTU per pound=$2.326 \times 10^3$ joules per kilogram
degrees F.=9/5 degrees C.+32
psi=6.8947 kilopascals.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Similarly, as the state of the art of gas turbines advances through improved higher temperature metallurgy, higher temperature construction materials, higher firing temperatures, higher compressor efficiency, higher turbine efficiency, and higher compressor ratios, the general temperature and pressure relationships between the first combustor, second combustor, gas generator and power turbine are considered to move upward accordingly from the levels presented heretofore and fall within the scope of the invention.

What is claimed as new is as follows:

1. A process for production of useful power comprising the following steps:
   (a) generating in a gas generator means a high temperature, high pressure first gas from ambient air and gas generator fuel without the use of intercooling:
   (b) reheating said first gas in a reheat combustor by injection and ignition of reheater fuel to form a high temperature, high pressure second gas;
   (c) driving with said second gas a power turbine for generation of useful power in a first generating means and production of an exhaust third gas;
   (d) exchanging heat in heat exchange means for said third gas with liquid water for generation of steam for production of useful power in a second generating means by a steam turbine, said gas generator means comprising a generator turbine drivingly connected by a generator shaft to a turbine gas compressor, said compressor receiving said ambient air for producing high pressure air and discharge thereof into a first combustor, said first combustor receiving said gas generator fuel and forming a combustion gas for driving said generator turbine, said generator turbine driving said compressor and forming said first gas for discharge to said reheat combustor, wherein the pressure ratio of said high pressure air to said ambient air is at least about 18 and said combustion gas is formed at a temperature of at least about 2000° F., and wherein said heat exchange means comprises an evaporator and an economizer, said evaporator receiving said third gas for transfer of heat therefrom to produce a fourth gas, said economizer receiving said fourth gas for extraction of heat therefrom to produce a discharge gas, said economizer receiving liquid water condensate from said steam turbine and receiving heat from said fourth gas for warming said water and discharging said warmed water to said evaporator, said evaporator receiving heat from said third gas for producing input steam from said warmed water, said input steam being discharged to said reheat combustor to form superheated steam.

2. The process of claim 1 wherein said reheater fuel is a lower grade fuel than said gas generator fuel.

3. The process of claim 2 wherein said reheater fuel is selected from the group consisting of coal gas, coal derived liquid, shale derived liquid, Bunker "C" type oil, residual oil, crude oil, and powdered coal.

4. The process of claim 1 wherein said first generating means is a first electric generator and said second generating means is a second electric generator.

5. The process of claim 4 wherein said first electric generator is drivingly connected to a pair of oppositely extending oppositely rotated driving shafts, each of said driving shafts being connected to a power turbine driven by said second gas.

6. The process of claim 1 wherein said gas generator fuel is common with said reheater fuel, both being supplied from a common source.

7. The process of claim 1 wherein said compressor comprises a five-stage low pressure section, followed by a 14-stage high pressure section, and said generator turbine comprises a two-stage high pressure section followed by a one-stage low pressure section, the firing temperature of said first combustor to produce said combustion gas is at least about 2100° F. and the pressure ratio of said high pressure air to said ambient air is about 29.

8. The process of claim 1 wherein said reheat combustor comprises an axial flow chamber having coils therein for receiving said input steam and generating said superheated steam, said chamber further including a plurality of fuel nozzles for injection of said reheat fuel into said chamber.

9. The process of claim 8 wherein said coils comprise a first set of coils arranged helically about the outer periphery of said reheat combustor and a second set of coils arranged helically within said reheat combustor and spaced from said first set of coils to form an annular space therebetween, said fuel nozzles being placed within said annular space and adjacent the entrance of said flow chamber to provide controlled combustion within said annular space, said input steam being introduced into said reheat combustor from a steam header, and being superheated by said reheating of said first gas and by said first gas contacting said coils before reheating.

10. The process of claim 8 wherein said first combustor has a rich fuel mixture and said reheat combustor has a lean fuel mixture to control nitrogen oxide pollutant emissions.

11. The process of claim 8 wherein said first combustor has a lean fuel mixture and said reheat combustor has a rich fuel mixture to control nitrogen oxide pollutant emissions.

12. The process of claim 8 wherein water or steam is injected into said reheat combustor to control nitrogen oxide pollutant emissions.

13. The process of claim 1 wherein said steam turbine generates an exhaust steam which is passed into said reheat combustor for heating, producing a reheated steam which is returned to said steam turbine for assisting in driving thereof.

14. The process of claim 8 wherein said steam turbine produces exhaust steam which is passed into said reheat combustor for reheating in said helical coils and returned therefrom to said steam turbine for assisting in driving thereof.

15. The process of claim 1 wherein said gas generator means, said reheat combustor, and said power turbine are combined in a linear axial arrangement and the flow of said first gas from said gas generator means through said reheat combustor and to said power turbine is substantially parallel to the linear axis of said arrangement.

16. A process for production of useful power comprising the following steps:
(a) generating in a gas generator means a high temperature, high pressure first gas from ambient air and gas generator fuel without the use of intercooling, said ambient air being compressed within said gas generator means before the introduction of gas generator fuel to produce high pressure air, the pressure ratio of said pressure air to said ambient air being at least about 18, said first gas being produced at a temperature of at least about 2000° F. by igniting said high pressure air and said gas generator fuel;
(b) passing said first gas into a reheat combustor for reheating by injection and ignition of reheater fuel thereinto, and for exchange of heat to form superheated steam and for forming a reheated second gas, said superheated steam being passed to a steam turbine;
(c) driving with said second gas a power turbine for generation of useful power in a first generating means to produce an exhaust third gas;
(d) exchanging heat in heat exchange means from said third gas with liquid water for generation of input steam, said input steam being discharged into said reheat combustor for producing said superheated steam, said steam turbine being driven by said superheated steam for production of useful power in a second generating means, wherein said reheat combustor comprises an axial flow chamber coils therein for receiving said input steam and generating said superheated steam, said chamber further including a plurality of fuel nozzles for injection of said reheat fuel into said cavity, said coils comprising a first set of coils arranged helically about the outer periphery of said reheat combustor and a second set of coils arranged helically within said reheat combustor and spaced from said first set of coils to form an annular space therebetween, said fuel nozzles being positioned within said annular space and adjacent the entrance of said flow chamber.

* * * * *

UNITED STATES PATENT AND TRADEMARK OFFICE
CERTIFICATE OF CORRECTION

PATENT NO. : 4,272,953

DATED : June 16, 1981

INVENTOR(S) : IVAN G. RICE

It is certified that error appears in the above-identified patent and that said Letters Patent are hereby corrected as shown below:

Claim 1, column 18, line 28, change "for" to --from--.

Claim 16, column 20, line 20, after "said" (first occurrence), insert --high--;

Claim 16, column 20, line 41, after "chamber" insert --having--.

Signed and Sealed this

Twenty-fourth Day of November 1981

[SEAL]

*Attest:*

GERALD J. MOSSINGHOFF

*Attesting Officer*     *Commissioner of Patents and Trademarks*